(12) United States Patent
Geckler et al.

(10) Patent No.: US 9,790,876 B2
(45) Date of Patent: Oct. 17, 2017

(54) ADVANCED EXHAUST GAS RECIRCULATION FUELING CONTROL

(71) Applicant: Cummins IP, Inc., Minneapolis, MN (US)

(72) Inventors: Samuel C. Geckler, Columbus, IN (US); Andrea Beck, Columbus, IN (US); Anthony Kyle Perfetto, Columbus, IN (US)

(73) Assignee: Cummins IP, Inc., Columbus, IN (US)

( * ) Notice: Subject to any disclaimer, the term of this patent is extended or adjusted under 35 U.S.C. 154(b) by 1077 days.

(21) Appl. No.: 13/803,976

(22) Filed: Mar. 14, 2013

(65) Prior Publication Data

US 2014/0278011 A1    Sep. 18, 2014

(51) Int. Cl.
| | |
|---|---|
| *F02D 41/00* | (2006.01) |
| *F02M 26/43* | (2016.01) |
| *F02D 41/12* | (2006.01) |
| *F02M 26/05* | (2016.01) |
| *F02M 26/23* | (2016.01) |

(52) U.S. Cl.
CPC ..... *F02D 41/0052* (2013.01); *F02D 41/0065* (2013.01); *F02D 41/0087* (2013.01); *F02M 26/43* (2016.02); *F02D 41/008* (2013.01); *F02D 41/126* (2013.01); *F02M 26/05* (2016.02); *F02M 26/23* (2016.02); *Y02T 10/47* (2013.01)

(58) Field of Classification Search
CPC ...... F02D 17/00; F02D 17/02; F02D 41/0087; F02D 41/123; F02D 41/126; F02D 21/04; F02D 21/08; F02D 21/083; F02D 41/047; F02D 41/005; F02D 41/0072; F02D 41/0255; F02D 41/024; F02M 26/43

USPC ........... 701/108, 103, 104, 113; 123/568.11, 123/332, 481, 198 DB, 198 F, 406.48; 60/605.2

See application file for complete search history.

(56) References Cited

U.S. PATENT DOCUMENTS

| | | | | |
|---|---|---|---|---|
| 4,143,635 A | * | 3/1979 | Lizuka | .................... F02D 17/02 |
| | | | | 123/481 |
| 4,274,382 A | * | 6/1981 | Sugasawa | ........... F02D 41/0087 |
| | | | | 123/198 F |
| 4,782,810 A | * | 11/1988 | Shimoda | ............. F02D 41/0072 |
| | | | | 123/478 |

(Continued)

FOREIGN PATENT DOCUMENTS

| | | | | |
|---|---|---|---|---|
| CN | 1682025 | | 10/2015 | |
| JP | S6165039 A | * | 4/1986 | ........... F02D 41/126 |

(Continued)

OTHER PUBLICATIONS

First Office Action issued for Chinese Patent Application No. 2014100858296 with English Language translation, dated Jun. 22, 2017, 10 pages.

*Primary Examiner* — Sizo Vilakazi
*Assistant Examiner* — Brian Kirby
(74) *Attorney, Agent, or Firm* — Foley & Lardner LLP

(57) ABSTRACT

For exhaust gas recirculation (EGR) fueling control, at least one donor cylinder of a plurality of cylinders in an engine provides exhaust gas to an air intake for the plurality of cylinders. A fuel variable restriction initially provides fuel concurrent with an intake stroke for the at least one donor cylinder in response to a transition from withholding the fuel to the plurality of cylinders.

20 Claims, 12 Drawing Sheets

(56) References Cited

U.S. PATENT DOCUMENTS

| | | | | |
|---|---|---|---|---|
| 5,444,977 A * | 8/1995 | Kawabata | F01N 11/007 60/276 |
| 5,505,174 A * | 4/1996 | Komoriya | F02D 41/0072 123/406.48 |
| 5,509,389 A * | 4/1996 | Oshima | F02D 37/02 123/406.5 |
| 5,517,976 A * | 5/1996 | Bachle | F01N 3/021 123/568.11 |
| 5,832,893 A * | 11/1998 | Kamura | F02D 41/08 123/305 |
| 5,988,144 A * | 11/1999 | Yoshioka | F02D 41/126 123/493 |
| 6,003,489 A * | 12/1999 | Kamura | F02D 41/0087 123/305 |
| 6,173,694 B1 * | 1/2001 | Kamura | F02D 41/0087 123/305 |
| 6,543,230 B1 * | 4/2003 | Schmid | F02D 41/0065 123/568.11 |
| 7,051,514 B2 * | 5/2006 | Midlam-Mohler | B60K 6/48 60/278 |
| 7,143,727 B1 * | 12/2006 | Winstead | F01L 9/04 123/198 F |
| 8,316,829 B2 * | 11/2012 | Piper | F02D 9/04 123/179.16 |
| 8,606,483 B2 * | 12/2013 | Krupadanam | F02D 41/0087 123/19 F |
| 2006/0144378 A1 * | 7/2006 | Zillmer | F02D 17/02 123/679 |
| 2008/0041339 A1 * | 2/2008 | Nishikiori | F02D 13/0261 123/406.48 |
| 2008/0216475 A1 * | 9/2008 | Kasper | F02M 26/39 60/605.2 |
| 2009/0013969 A1 * | 1/2009 | Winstead | F02D 13/0207 123/481 |
| 2009/0038308 A1 * | 2/2009 | Nagae | F01N 3/035 60/602 |
| 2009/0199825 A1 | 8/2009 | Piper et al. | |
| 2010/0185380 A1 * | 7/2010 | Katou | F02D 13/0211 701/103 |
| 2010/0235074 A1 * | 9/2010 | Shinagawa | F02D 41/126 701/108 |
| 2010/0250103 A1 * | 9/2010 | Shimo | F02D 41/0065 701/108 |
| 2010/0299049 A1 * | 11/2010 | Kang | F02D 41/0087 701/103 |
| 2011/0041495 A1 * | 2/2011 | Yager | F02B 29/0437 60/605.2 |
| 2011/0253113 A1 * | 10/2011 | Roth | F02D 41/008 123/568.12 |
| 2011/0289904 A1 * | 12/2011 | Miyashita | F02D 41/0082 60/278 |
| 2012/0048244 A1 | 3/2012 | Hayman et al. | |
| 2012/0078492 A1 * | 3/2012 | Freund | F02D 41/0065 701/108 |
| 2012/0204844 A1 * | 8/2012 | Gingrich | F02B 27/0215 123/568.11 |
| 2012/0204845 A1 * | 8/2012 | Gingrich | F02M 26/43 123/568.17 |
| 2012/0222659 A1 * | 9/2012 | Kulkarni | F02M 26/43 123/568.11 |
| 2012/0240557 A1 * | 9/2012 | Kawaguchi | F01N 3/2013 60/278 |
| 2012/0260894 A1 * | 10/2012 | Hayman | F02B 47/08 123/559.1 |
| 2012/0298070 A1 * | 11/2012 | Akinyemi | F02D 41/0047 123/294 |
| 2012/0323465 A1 * | 12/2012 | Peters | F02D 41/0082 701/104 |
| 2012/0323470 A1 * | 12/2012 | Klingbeil | F02D 41/0065 701/108 |
| 2013/0000614 A1 * | 1/2013 | Freund | F02D 21/08 123/568.2 |
| 2013/0024086 A1 * | 1/2013 | Henry | F02D 41/021 701/102 |
| 2013/0030672 A1 * | 1/2013 | Klingbeil | F02D 41/0085 701/109 |

FOREIGN PATENT DOCUMENTS

| | | | |
|---|---|---|---|
| JP | 62294736 A | * 12/1987 | |
| JP | 06123258 A | * 5/1994 | |
| JP | 2581033 B2 | * 2/1997 | F02D 41/126 |
| JP | 4735519 B2 | * 7/2011 | F02D 41/0065 |

* cited by examiner

214

ADVANCED EXHAUST GAS RECIRCULATION FUELING CONTROL

FIELD

This disclosure relates generally to fueling control, and more particularly to exhaust gas recirculation (EGR) fueling control.

BACKGROUND

EGR is used to reduce the amount of nitrous oxides in exhaust gas generated by an internal combustion engine and can be used to reduce the occurrence of knocking combustion. Generally, EGR systems re-circulate a portion of the exhaust gas generated by a combustion event within a combustion chamber of the engine back into the combustion chamber for a future combustion event. The recirculated exhaust gas reduces the temperature of the combustion components prior to combustion. The lower temperature of the combustion components promotes a reduction in the amount of nitrous oxides generated as a result of the combustion process and may reduce engine knock. One or more dedicated donor cylinders may provide the exhaust gas that is re-circulated.

SUMMARY

The subject matter of the present application has been developed in response to the present state of the art, and in particular, in response to the problems and needs in the art that have not yet been fully solved by currently available dedicated EGR fueling control techniques. Accordingly, in certain embodiments, the subject matter of the present application has been developed to provide an apparatus, method, and system for dedicated EGR fueling control.

An apparatus is disclosed for dedicated EGR fueling control. The apparatus includes at least one donor cylinder of a plurality of cylinders in an engine. The at least one donor cylinder provides exhaust gas to an air intake for the plurality of cylinders. The apparatus further includes a fuel variable restriction that initially provides fuel concurrent with an intake stroke for the at least one donor cylinder in response to a transition from withholding the fuel to the plurality of cylinder to providing the fuel to the plurality of cylinders. The method and system also perform the functions of the apparatus.

Reference throughout this specification to features, advantages, or similar language does not imply that all of the features and advantages that may be realized with the subject matter of the present disclosure should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
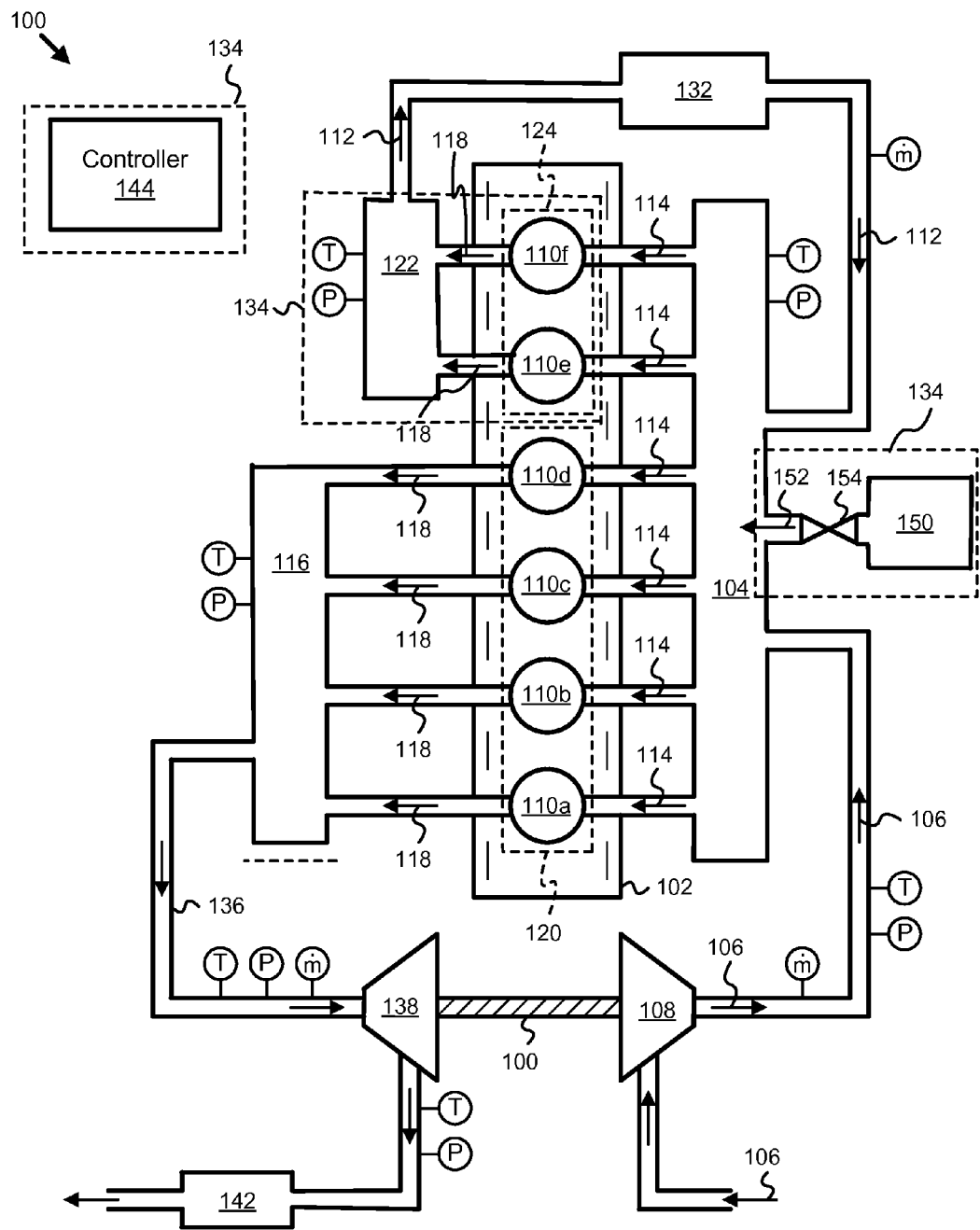
FIG. 1 is a schematic illustration depicting an EGR system.

FIG. 1 is a schematic illustration depicting one embodiment of an EGR system 100 controlling EGR fueling in an internal combustion engine 102. The engine 102 may be a gasoline engine, a diesel engine, or the like.

The system 100 includes various sensors for monitoring operating conditions within a given embodiment. Sensors may be strategically disposed within the system 100 and may be in communication with a controller 144. To illustrate the various locations and the types of sensors that may be useful for determining a set of operating conditions for the system 100, temperature sensors, pressure sensors, and mass flow sensors have been placed on the schematic illustration. One of skill in the art may determine the preferred placement and the preferred types of sensors for a particular application.

On the schematic illustration of the system 100, temperature sensors are denoted with the letter 'T', pressure sensors are denoted with the letter 'P', and mass flow sensors are denoted with the 'm-dot' symbol. Furthermore, sensors may comprise virtual sensors detecting operating parameters of the system 100 based on other information, such as engine rotations per minute (rpm) for example.

The system 100 includes an air intake 104 receiving a fresh air stream 106 that may pass through a compressor 108. The compressor 108 may increase the pressure on the air intake side of the engine 102 by compressing the fresh air stream 106, and further allowing more fuel to be combusted in cylinders 110.

The system 100 includes an exhaust manifold 116 receiving exhaust gas 118 from a non-donor cylinder set 120 of non-donor cylinders 110. In the depicted embodiment of the system 100, the exhaust manifold 116 receives the exhaust gas 118 from the non-donor cylinders 110a, 110b, 110c, and 110d.

An EGR manifold 122 receives exhaust gas 118 from a donor cylinder set 124. In the depicted embodiment, the EGR manifold 122 receives exhaust gas 118 from dedicated or donor cylinders 110e and 110f. In alternate embodiments of the system 100, the donor cylinder set 124 may comprise between one and three cylinders 110 inclusively. For example, the donor cylinder set 124 may include one cylinder 110, cylinder 110f, with the remaining cylinders 110a, 110b, 110c, 110d, and 110e included in the non-donor cylinder set 120.

In one embodiment, the non-donor cylinder set 120 and the donor cylinder set 124 may each include any number of cylinders such that each set 120, 124 has at least one cylinder. For example, in a six cylinder engine 102, the non-donor cylinder set 120 may have three cylinders 110 while the donor cylinder set 124 may have three cylinders 110. In another example, in a six cylinder engine 102, the donor cylinder set 124 may have one cylinder 110, while the non-donor cylinder set 120 may have five cylinders 110. In another example (not shown), in a six cylinder engine 102, the non-donor cylinder set 120 may have two cylinders while the donor cylinder set 124 may have two cylinders 110, and two cylinders 110 of the engine 102 may exhaust separately from both the exhaust manifold 116 and the EGR manifold 122.

The donor cylinder set 124 may comprise any combination of cylinders 110, including non-sequential cylinders 110. For example, a donor cylinder set 124 may include three cylinders 110 such as cylinders 110d, 110e, and 110f. An eight cylinder engine 102 may include a donor cylinder set 124 comprising between one and four cylinders 110 inclusively. For any given combustion engine 102, the donor cylinder set 124 may comprise up to one-half of a total number of cylinders 110.

The system 100 further includes an EGR flow 112 flowing from the EGR manifold 122 to the air intake 104 and mixing with the fresh air stream 106 to form a blended stream 114. In one embodiment, the system 100 further comprises an EGR cooler 132 that cools the EGR flow 112.

The exhaust passage 136 may direct exhaust gas 118 from the exhaust manifold 116 through a turbocharger 138. In one embodiment the turbocharger 138 is a variable geometry turbocharger (VGT) 138 that induces a variable backpressure on the exhaust manifold 116. The system 100 further includes an after treatment system 142 downstream of the turbocharger 138.

The system 100 includes a fuel variable restriction 154 that provides fuel 152 from a fuel source 150. The fuel variable restriction 154 may be a valve, a meter, or the like. The fuel source 150 may be a carburetor, a fuel injector, or the like. The fuel variable restriction 154 may be embodied in the carburetor. Alternatively, one or more fuel variable restrictions 154 may be embodied in the fuel injector. The fuel variable restriction 154 controls the provision of the fuel 152 to the air intake 104. The fuel variable restriction 154 may be controlled by the controller 144.

In one embodiment, each cylinder 110 has a dedicated fuel variable restriction 154 (not shown). Alternatively, the donor cylinder set 124 has a dedicated first fuel variable restriction 154 while the non-donor cylinder set 120 has a dedicated second fuel variable restriction 154 (not shown).

Referring again to FIG. 1, the system 100 includes a controller 144 configured to interpret sensor information for a set of engine operating conditions for the system 100. The controller 144 may communicate an actuator signal, in response to the set of engine operating conditions, to at least one actuator in the system 100. The fuel variable restriction 154 may comprise one actuator in the system 100. The VGT 138 may also be an actuator in the system 100.

The system 100 includes an apparatus 134 to control EGR fueling. In one embodiment, the apparatus 134 includes the EGR manifold 122, the donor cylinder set 124, the fuel variable restriction 154, and the fuel source 150. The apparatus 134 may also include the controller 144.

During the operation of the system 100, the fuel variable restriction 154 may withhold fuel 152 from the air intake 104. For example, the fuel variable restriction 154 may withhold fuel 152 from the air intake 104 while the engine 102 is idling or is under a low load. However, when the system 100 transitions from idling to providing power, the fuel variable restriction 154 again provides fuel 152 to the air intake 104. Unfortunately, because the donor cylinders 110 have not been combusting fuel 152, there is little or no EGR flow 112 to provide to the air intake 104. As a result, combustion in the cylinders 110 may be susceptible to engine knock and/or producing nitrous oxides.

The embodiments described herein control the provision of fuel 152 to the cylinders 110 so that the donor cylinders 110 of the donor cylinder set 124 first receive the fuel 152, combust the fuel 152, and provide the EGR flow 112 for the other cylinders 110 of the engine 102 as will be described hereafter. As a result, a number of cylinder firings before the EGR flow 112 is available to the air intake 104 is reduced.

Figure 2:
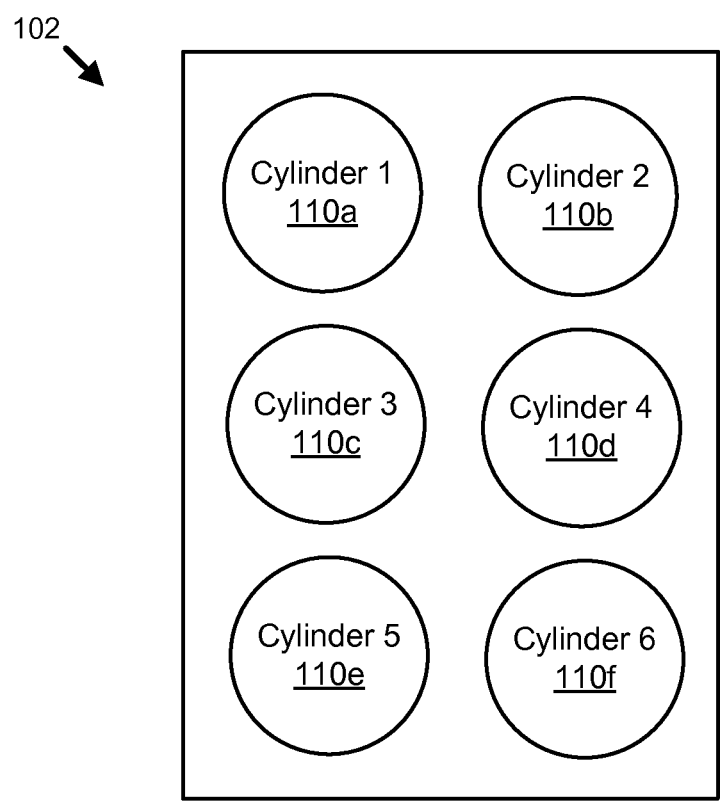
FIG. 2 is a schematic diagram depicting engine cylinders.

Referring to FIG. 2, the cylinders 110 for the engine 102 of FIG. 1 are shown. The engine 102 is depicted as having 6 cylinders 110. However, the embodiments may be practiced with any number of cylinders 110. The cylinders 110 may fire in a specified firing order. For a six-cylinder engine 102, the firing orders may include but are not limited to: 1-5-3-6-2-4, 1-4-3-6-2-5, 1-6-5-4-3-2, 1-2-3-4-5-6, 1-4-2-5-3-6, 1-4-5-2-3-6, 1-6-3-2-5-4, 1-6-2-4-3-5, and 1-6-2-5-3-4.

For a four-cylinder engine 102, the firing orders may include but are not limited to: 1-3-4-2, 1-2-4-3, 1-3-2-4, 1-4-3-2, and 1-2-3-4. For a three-cylinder engine 102 the firing orders may include: 1-2-3 and 1-3-2.

For an 8-cylinder engine 102, the firing orders may include but are not limited to: 1-8-4-3-6-5-7-2, 1-8-7-2-6-5-4-3, 1-3-7-2-6-5-4-8, 1-5-4-8-7-2-6-3, 1-6-2-5-8-3-7-4, 1-8-7-3-6-5-4-2, 1-5-4-2-6-3-7-8, 1-5-6-3-4-2-7-8, 1-5-3-7-4-8-2-6, 1-2-7-8-4-5-6-3, 1-2-7-3-4-5-6-8. For simplicity, the six-cylinder 1-5-3-6-2-4 firing order will be described herein. However, the embodiments may be practiced for any firing order for any number of cylinders 110.

Figure 3:
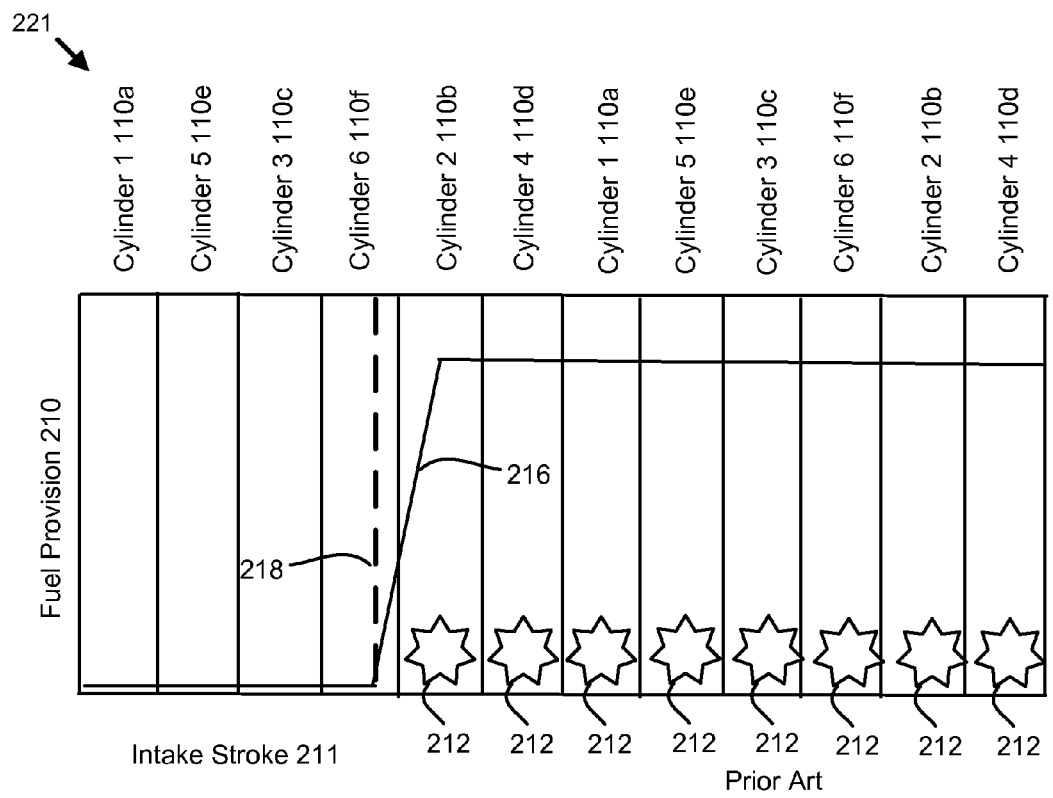
FIG. 3 is a chart illustrating EGR fuel provision and firing found in the Prior Art.

Referring to FIG. 3, a chart 221 illustrates EGR fuel provision and firing of the prior art. Fuel provision 210 from the fuel source 150 through the fuel variable restriction 154 is shown on the vertical axis. The fuel amount 216 increases in the up direction.

The cylinders 110 having an intake stroke 211 are shown along the horizontal axis. Earlier intake strokes 211 in time are shown to the left and later intake strokes 211 in time are shown to the right. The cylinders 110 are shown receiving fuel 152 in the 1-5-3-6-2-4 firing order. In addition, the firing 212 of each cylinder 110 for the subsequent power stroke after the depicted intake stroke 211 and a compression stroke is shown with the intake stroke 211. For simplicity of illustration, the subsequent firing 212 during the power stroke is shown with the intake stroke 211, indicating that the firing will occur for the power stroke of the intake stroke 211, although one of skill in the art will recognize that the firing 212 is not concurrent with the intake stroke 211 but occurs subsequent to the intake stroke 211.

In the depicted embodiment, the fuel variable restriction 154 transitions from withholding fuel 152 from the air intake 104 to providing fuel 152 to the air intake 104. The transition may be in response to a transition event 218 such as an acceleration of the engine 102. For example, the engine 102 may be idling while descending a hill. While idling, the fuel variable restriction 154 may withhold fuel 152 from the air intake 104. When the bottom of the hill is reached and the engine 102 is again called on to provide power, the fuel variable restriction 154 transitions from withholding fuel 152 to providing fuel 152. The acceleration of the engine 102 to provide power is one example of a transition event 218.

In the depicted embodiment, cylinder 2 110*b* first receives the provision of fuel 152 and fires 212 subsequent and in response to the transition event 218. Unfortunately, because a donor cylinder set 124 has not been firing prior to the provision of fuel 152 to cylinder 2 110*b*, no EGR flow 112 is available in the air intake 104. Similarly, when cylinder 4 110*d* and cylinder 1 110*a* fire 212, the EGR flow 112 is still not available in the air intake 104 as the cylinders 110 of the donor cylinder set 124 have not yet fired. As a result, cylinder 2 110*b*, cylinder 4 110*d*, and cylinder 1 110*a* may produce nitrous oxides and are susceptible to engine knock.

Figure 4:
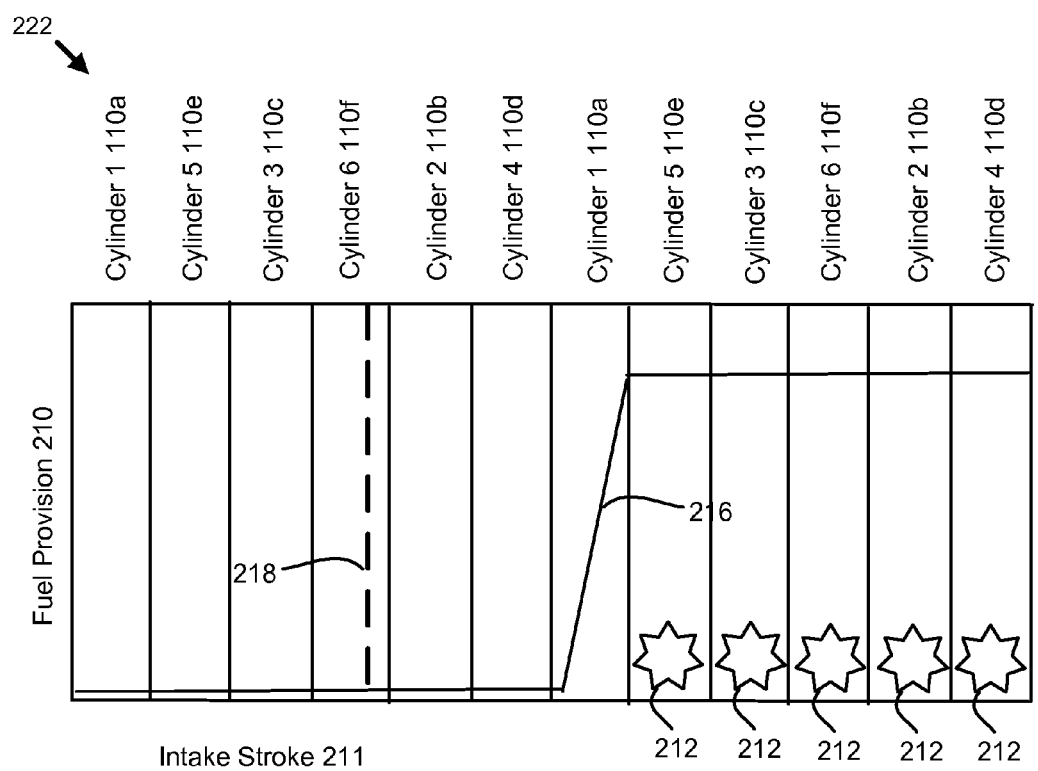
FIG. 4 is a chart illustrating EGR fuel provision and firing.

Referring to FIG. 4, a chart 222 illustrates one embodiment of EGR fuel provision and firing. The organization of the chart 222 is the organization of the chart 221 of FIG. 3. In one embodiment, the fuel provision 210 is indicative of the fuel 152 provided to the air intake 104. Alternatively, the fuel provision 210 indicates the fuel 152 that is provided to an individual cylinder 110. The controller 144 may control the provision of the fuel 152 and the firing 212 of each cylinder 110. Each cylinder 110 may be fired 212 by spark ignition.

As in FIG. 3, the transition event 218 is depicted as occurring during the intake stroke 211 of cylinder 6 110*f*. However, rather than immediately providing fuel 152 to the air intake 104 after the transition event 218, the fuel variable restriction 154 initially provides fuel 152 concurrent with the intake stroke for cylinder 5 110*e*, a donor cylinder 110 of the donor cylinder set 124. In addition, the fuel variable restriction 154 may withhold fuel 152 from the air intake 104 while non-donor cylinders 110 such as cylinder 2 110*b*, cylinder 4 110*d*, and cylinder 1 110*a* have intake strokes 211.

As a result of the provision of fuel to the donor cylinder, cylinder 5 110*e*, the EGR flow 112 begins to be available in the air intake 104 for subsequent intake strokes 211. Therefore, the number of cylinders 110 that are provided with fuel 152 before the EGR flow 112 is available in the air intake 104 is reduced.

Figure 5:
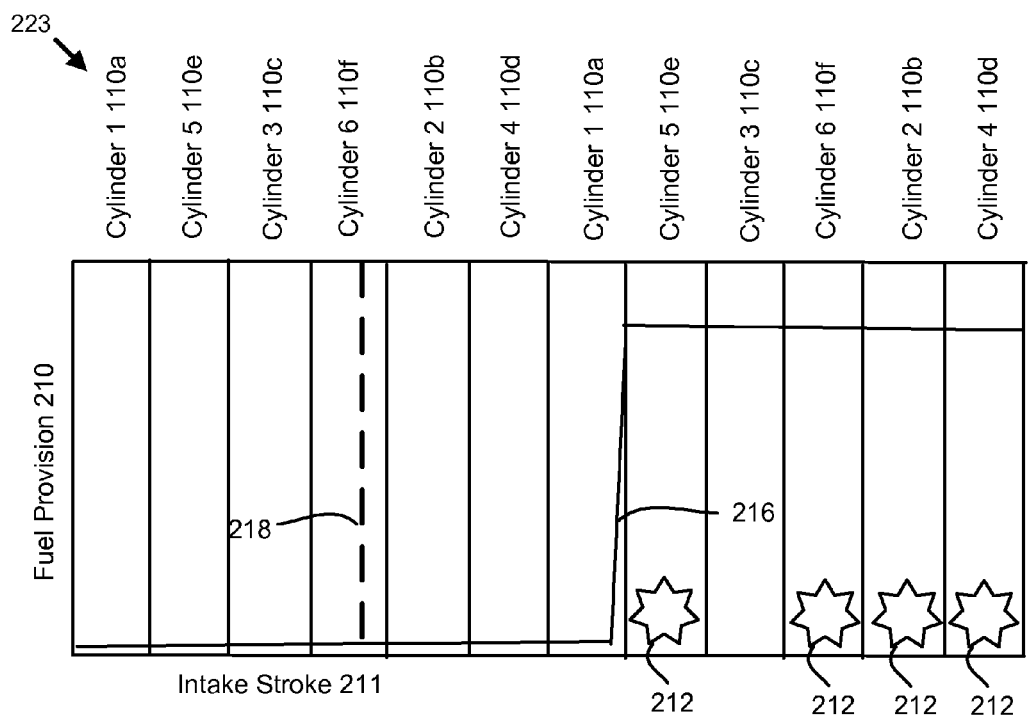
FIG. 5 is a chart illustrating EGR fuel provision and firing.

Referring to FIG. 5, a chart 223 illustrates one embodiment of EGR fuel provision and firing. The organization of the chart 223 is the organization of the charts 221 and 222 of FIGS. 3 and 4. As in chart 222, in response to the transition event 218, the fuel variable restriction 154 withholds fuel 152 from the cylinders 110 until the intake stroke 211 for one of the donor cylinders 110, cylinder 5 110*e*. The fuel variable restriction 154 then provides fuel 152 to cylinder 5 110*e* for the intake stroke of cylinder 5 110*e*. The donor cylinder 110, cylinder 5 110*e*, subsequently fires 212 generating the EGR flow 112 for the air intake 104.

However, providing fuel 152 to and firing 212 cylinder 5 110*e* does not immediately generate the EGR flow 112 for the intake stroke 211 of the subsequent cylinder, in the depicted example a non-donor cylinder 110, cylinder 3 110*c*. The controller 144 may therefore not fire 212 the subsequent non-donor cylinder 110. Instead, the controller 144 may fire 212 a subsequent donor cylinder 110, cylinder 6 110*f* in the depicted example, to continue to generate the EGR flow 112. The fuel variable restriction 154 may provide the fuel 152 to a non-donor cylinder 110, cylinder 2 110*b* in the depicted example, when the EGR flow 112 is available from a donor cylinder 100 such as cylinder 5 110*e*.

Figure 6:
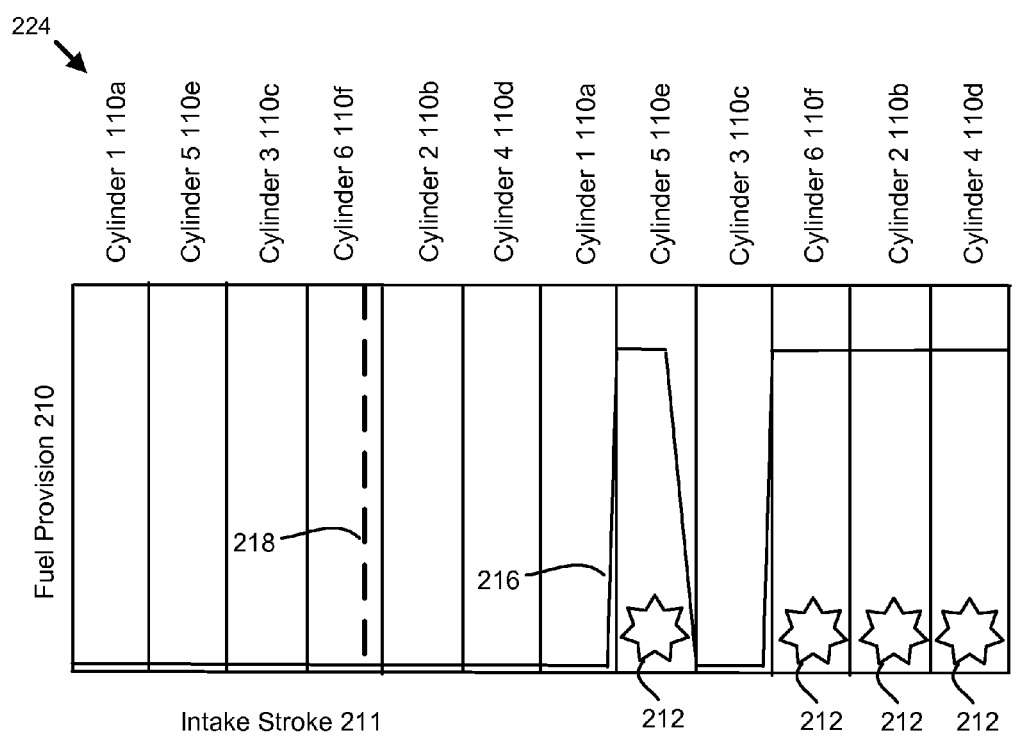
FIG. 6 is a chart illustrating EGR fuel provision and firing.

Referring to FIG. 6, a chart 224 illustrates one embodiment of EGR fuel provision and firing. The organization of the chart 224 is the organization of the charts 221-223 of FIGS. 3-5. A first donor cylinder 110, cylinder 5 110*e*, is provided with fuel 152 and fired 212 in response to the transition event 218. However, the resulting EGR flow 112 may be insufficient. As a result, the fuel variable restriction 154 does not provide fuel 152 to the intake stroke 211 for a subsequent non-donor cylinder 110, cylinder 3 110*c* as illustrated in FIG. 6. In addition, the controller 144 may not fire 212 the subsequent non-donor cylinder 110, cylinder 3 110*c*.

The fuel variable restriction 154 may then provide the fuel 152 to the subsequent donor cylinder 110, cylinder 6 110*f*, and the subsequent donor cylinder 110 is fired 212. Thus two donor cylinders 110 are provided with fuel 152 before a non-donor cylinder 110 is provided with fuel 152.

In one embodiment, the fuel variable restriction 154 only provides fuel 152 to a non-donor cylinder 110 if sufficient EGR flow 112 is available to the air intake 104. The controller 144 may employ one or more pressure sensors, temperature sensors, or the like to determine if sufficient EGR flow 112 is available as will be described hereafter. Alternatively, the controller 144 may forecast a sufficiency of EGR flow 112 as a function of the fuel 152 combusted as will be described hereafter.

The controller 144 may begin providing fuel 152 to cylinders 110 from the non-donor cylinder set 120 when there is sufficient EGR flow 112. In the depicted example, a first non-donor cylinder 110 of the non-donor cylinder set 120, cylinder 2 110b is fired 212 after 2 cylinders 110 from the donor cylinder set 124 are provided with fuel 212.

Figure 7:
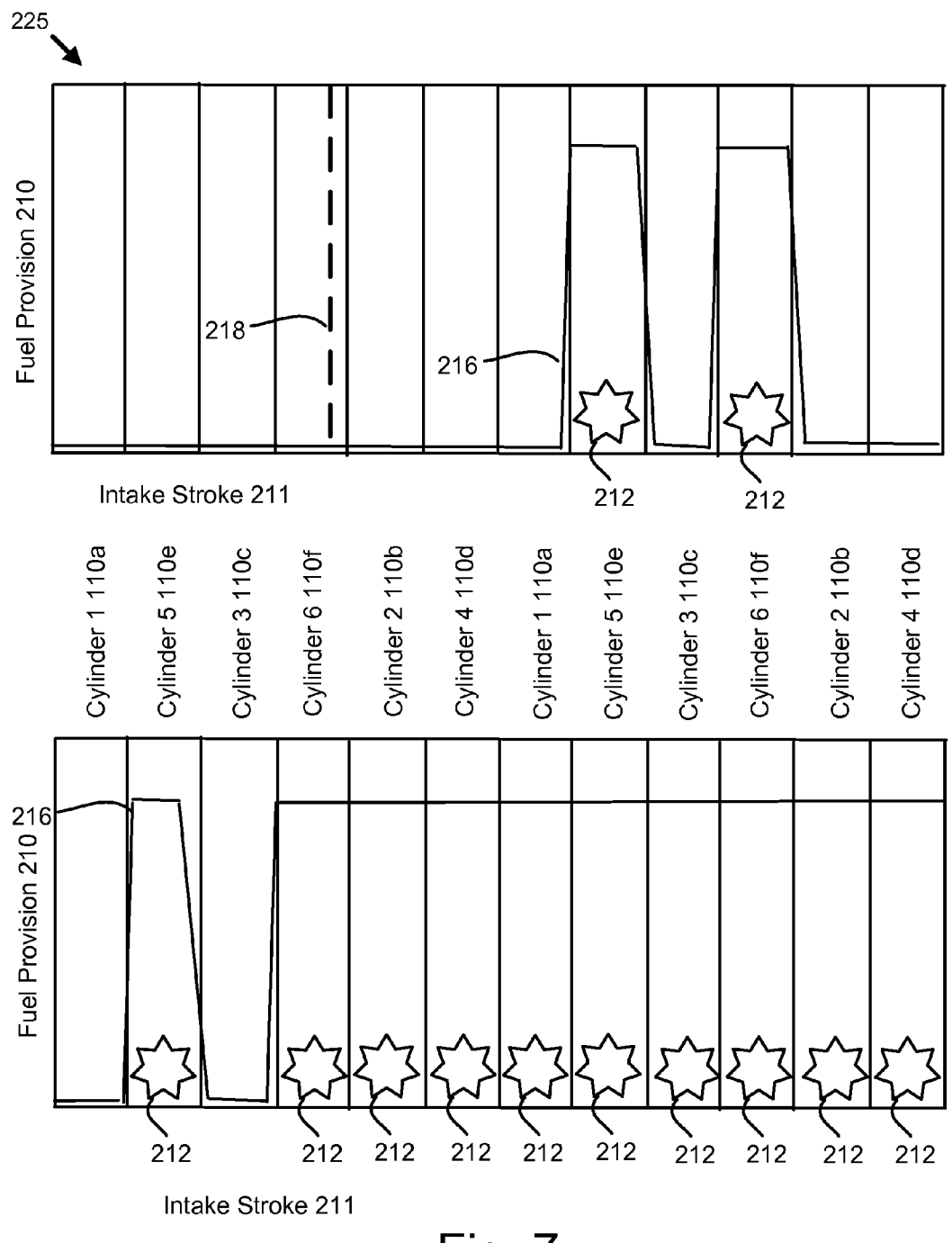
FIG. 7 is a chart illustrating EGR fuel provision and firing.

Referring to FIG. 7, a chart 225 illustrates one embodiment of EGR fuel provision and firing. The organization of the chart 225 is the organization of the charts 221-224 of FIGS. 3-6. However, four complete firing cycles are shown.

A first donor cylinder 110, cylinder 5 110e, is provided with fuel 152 and fired 212 in response to the transition event 218. If the EGR flow 112 is insufficient, the fuel variable restriction 154 may withhold fuel 152 from the subsequent intake stroke 211 for a non-donor cylinder 110 in the firing order, cylinder 3 110c, and the subsequent non-donor cylinder 110, is not fired 212. The fuel variable restriction 154 may provide fuel 152 to the subsequent donor cylinder 110, cylinder 6 110f, and the subsequent donor cylinder 110 is fired 212. If the EGR flow 112 is still insufficient, the fuel variable restriction 154 may withhold fuel 152 from subsequent intake strokes 211 for other non-donor cylinders 110 until the subsequent donor cylinder 110, cylinder 5 110e, is provided with fuel 152. In one embodiment, the fuel variable restriction 154 only provides fuel 152 to each donor cylinder 110 and withholds fuel 152 from each non-donor cylinder 110 and the controller 144 only fires 212 each donor cylinder until there is sufficient EGR flow 112.

Figure 8:
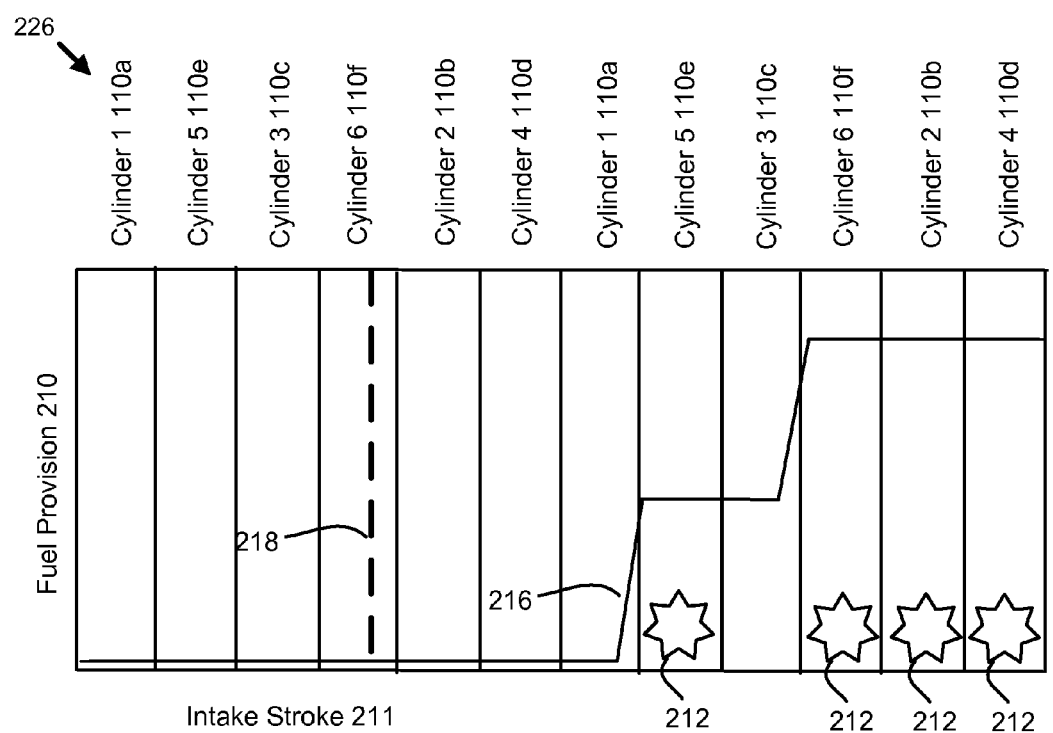
FIG. 8 is a chart illustrating EGR fuel provision and firing.

Referring to FIG. 8, a chart 226 illustrates one embodiment of EGR fuel provision and firing. The organization of the chart 226 is the organization of the charts 221-225 of FIGS. 3-7. The chart 226 depicts EGR fuel provisioning with modulated torque.

In one embodiment, the fuel variable restriction 154 withholds fuel 152 from non-donor cylinders 110 subsequent to the transition event 218 until the intake stroke 211 of a first donor cylinder 110 when the fuel variable restriction 154 provides fuel 152. The subsequent non-donor cylinder 110 may not be fired 212 because the EGR flow 112 is insufficient. However, the non-firing of the subsequent non-donor cylinder 110 may be discernible and/or viewed negatively by an operator.

To make the non-firing of non-donor cylinders 110 less discernible, the embodiments may reduce the torque generated by the donor cylinders 110 while the non-donor cylinders 110 are not fired 212. In the depicted embodiment, the fuel amount 216 is less than would otherwise be required by the transition event 218. As a result, the firing of the donor cylinders 110 followed by the non-firing of one or more non-donor cylinders 110 is less discernible. In an alternative embodiment, the torque of the donor cylinders 110 may be reduced by retarding the centroid of heat release for the donor cylinders 110 as will be described hereafter. Retarding the centroid of heat reduces torque without reducing the exhaust gas 118 generated.

Figure 9:
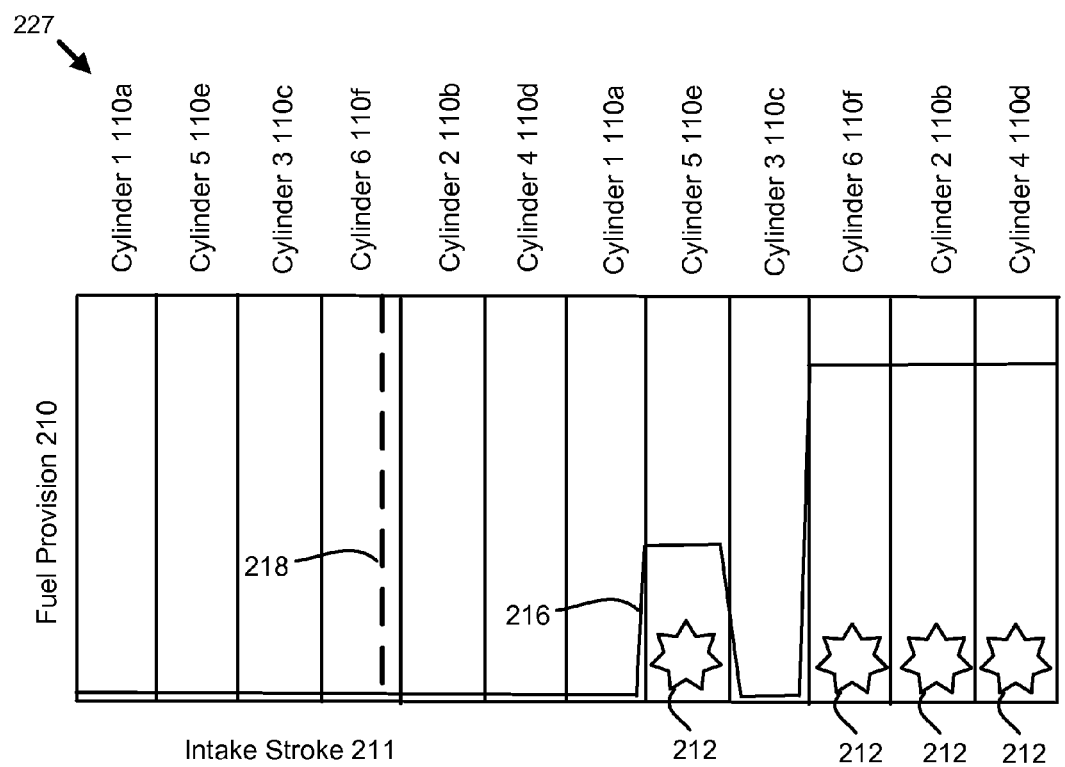
FIG. 9 is a chart illustrating EGR fuel provision and firing.

Referring to FIG. 9, a chart 227 illustrates one embodiment of EGR fuel provision and firing. The organization of the chart 227 is the organization of the charts 221-226 of FIGS. 3-8. The chart 227 depicts an alternate embodiment of EGR fuel provisioning with modulated torque.

In one embodiment, the fuel variable restriction 154 withholds fuel 152 from non-donor cylinders 110 subsequent to the transition event 218 until the intake stoke 211 of a donor cylinder 110, when the fuel variable restriction 154 provides fuel 152. The fuel variable restriction 154 may withhold fuel 152 from the subsequent non-donor cylinders 110 and the subsequent non-donor cylinders 110 may not be fired 212 because the EGR flow 112 is insufficient. However, the non-firing of the subsequent non-donor cylinder 110 may be discernible and/or viewed negatively by an operator as described for FIG. 8.

To make the non-firing of non-donor cylinders 110 less discernible, the embodiments may reduce the torque generated by the donor cylinders 110 while fuel 152 is being withheld from the non-donor cylinders 110 and/or while the non-donor cylinders 110 are not fired 212. In the depicted embodiment, the fuel amount 216 is less than would otherwise be required by the transition event 218. As a result, the initial provision of fuel 152 concurrent with the intake stroke 211 of the donor cylinder 110 is followed by the non-firing of one or more non-donor cylinders 110 is less discernible. In an alternative embodiment, the torque of the donor cylinders 110 may be reduced by retarding the centroid of heat release for the donor cylinders 110 as will be described hereafter.

Figure 10A:
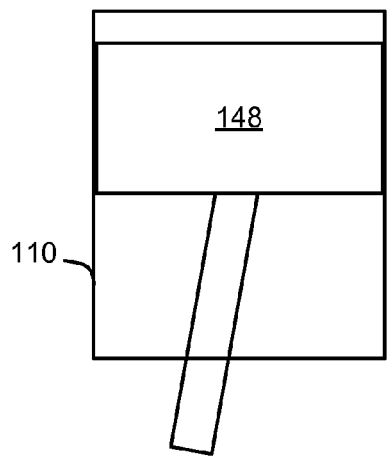
FIGS. 10A-D are side view drawings of a piston.
Figure 10B:
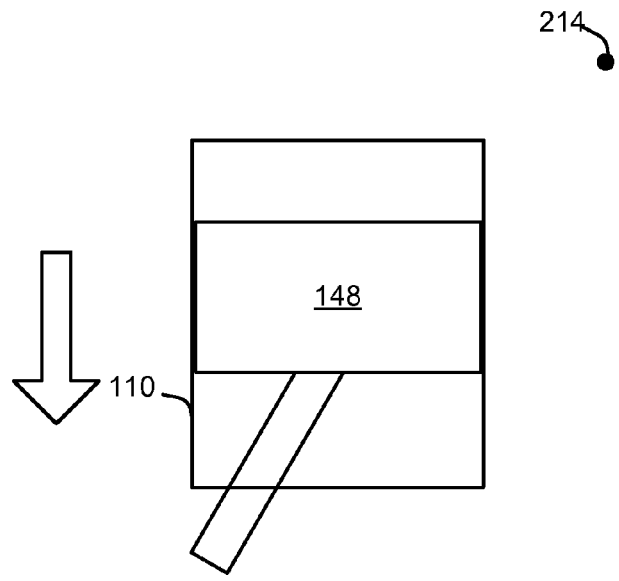
Figure 10C:
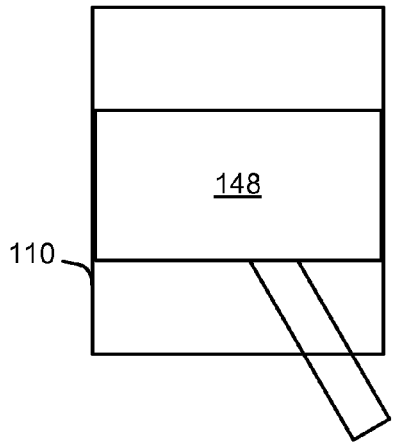
Figure 10D:
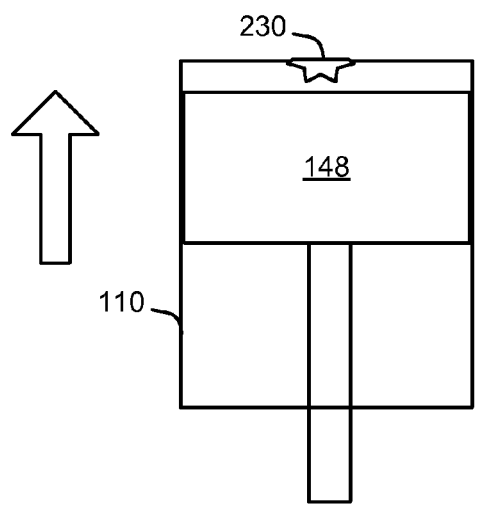

FIGS. 10A-D are side view schematic drawings of a piston 148 in a cylinder 110. FIGS. 10A and 10B show the intake stroke with the piston 148 descending and drawing the fresh air stream 106, the EGR flow 112, and the fuel 152 into the cylinder 110. FIG. 10C depicts a compression stroke with the cylinder 148 where the fresh air stream 106, the EGR flow 112, and the fuel 152 are compressed. FIG. 10D shows the firing 212 of the cylinder 110 to initiate the power stroke. The cylinder 110 may be fired 212 by a spark igniter 230 such as a spark plug to produce optimum torque. However, the controller 144 may retard the firing 212 to retard the centroid of heat release to reduce the torque produced by the cylinder 110.

Figure 11:
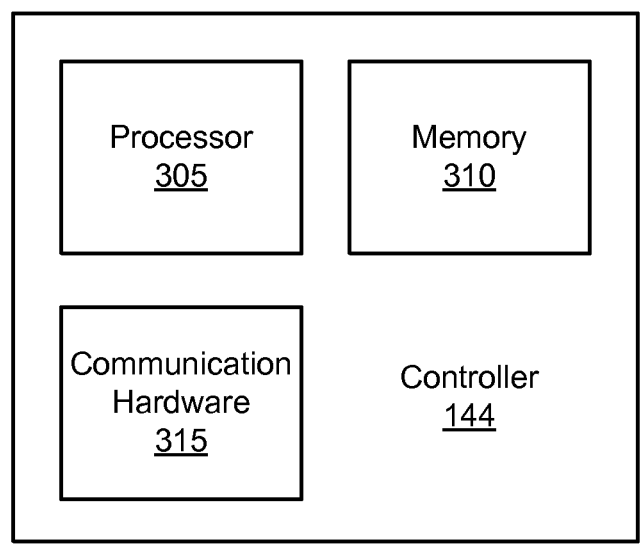
FIG. 11 is a schematic block diagram of a controller.

Referring to FIG. 11, the controller 144 of FIG. 1 is shown. The controller 144 may include a processor 305, a memory 310, and communication hardware 315. The memory 310 may be a semiconductor memory, a micromechanical memory, or the like. The memory 310 may store program code. The processor 305 may execute the program code to perform the functions of the system 100 and the apparatus 134. The communication hardware 315 may communicate with other devices. For example, the communication hardware 315 may communicate with and/or control the fuel variable restriction 154, the spark igniter 230 firing 212 the cylinders 110, the sensors, and the like. Alternatively, the controller 144 may be comprised of dedicated semiconductor logic.

Figure 12:
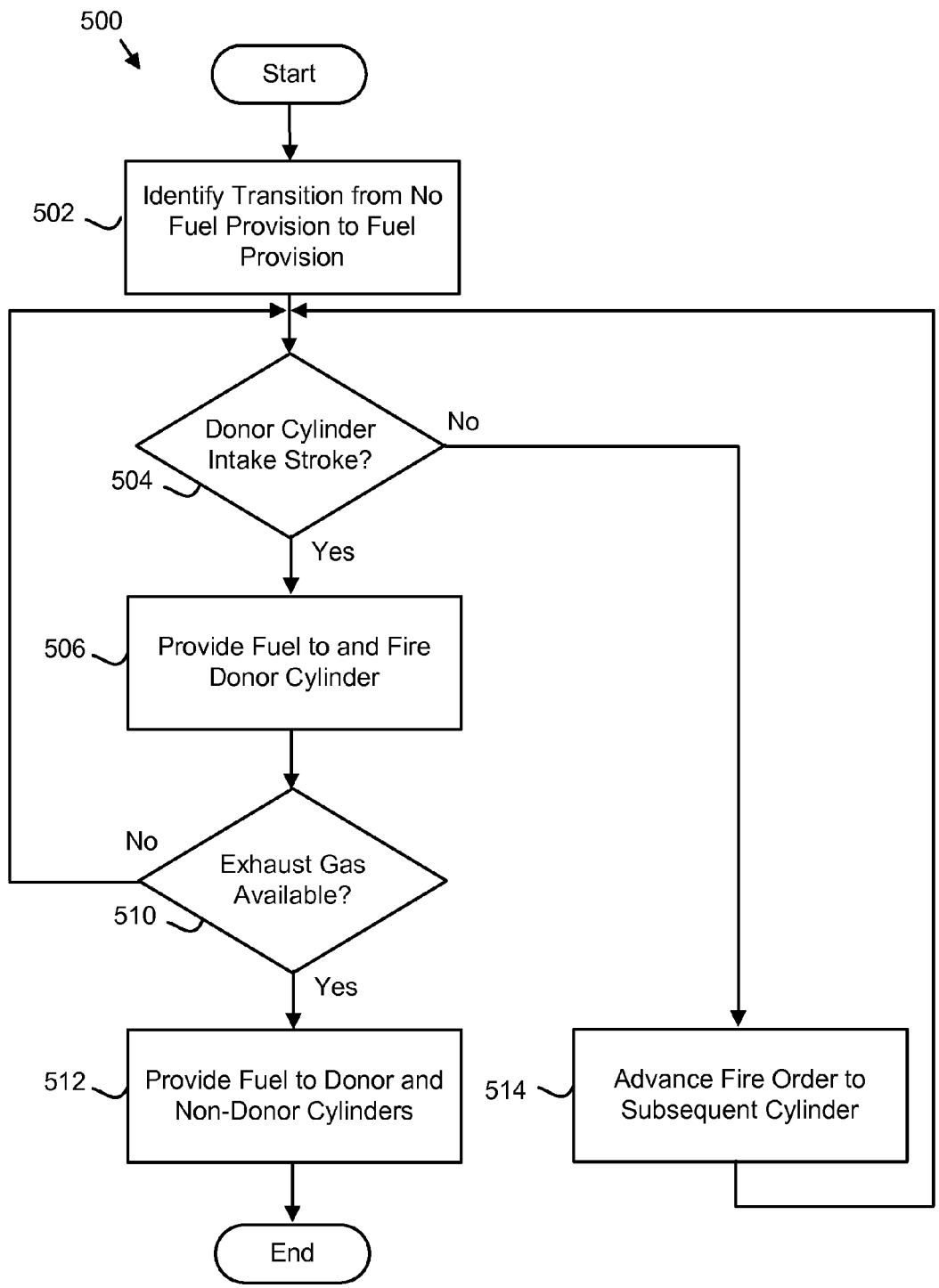
FIG. 12 is schematic flow chart diagram of an EGR fueling control method.

Referring to FIG. 12, an EGR fueling control method 500 is shown. The method 500 may be performed by the elements of the system 100 and/or apparatus 134. In one embodiment, the controller 144 controls the functions of the method 500.

The method 500 starts, and in one embodiment, the controller 144 identifies 502 a transition event 218. The transition event 218 may be a transition from no fuel provision to the cylinders 110 to fuel provision to the cylinders 110. The transition event 218 may be an acceleration of the engine 102 after the engine 102 has been idling. In one embodiment, prior to the transition event 218, the fuel variable restriction 154 withholds fuel 152 from the air intake 104 and the cylinders 110.

The controller 144 may determine 504 if a subsequent intake stroke 211 is for a donor cylinder 110. The subsequent intake stroke 211 may be the intake stroke starting after a provision time interval. The provision time interval may be a time required to provide fuel from the fuel variable restriction 154 for an intake stroke 211.

If the subsequent intake stroke 211 is not for a donor cylinder 110, the controller 144 may allow the fire order of the cylinders 110 to advance to the intake stroke 211 of a next subsequent cylinder 110. In one embodiment, the controller 144 allows the fire order to advance to the next subsequent cylinder 110 without the fuel variable restriction 154 providing fuel 152 to the cylinders 110.

If the controller 144 determines 504 that the subsequent intake stroke 211 is for a donor cylinder 110, the fuel variable restriction 154 provides 506 fuel 152 to the donor cylinder 110. In addition, the donor cylinder 110 is subsequently fired 212 during a power stroke, combusting the fuel 152. In one embodiment, the torque of the donor cylinder 110 is reduced.

In response to providing fuel 152 to and firing 212 the donor cylinder 110, the controller 144 may determine 510 if sufficient EGR flow 112 is available. In one embodiment, the controller 144 employees one or more of the pressure sensors, temperature sensors, and/or mass flow sensors to determine 510 if there is sufficient EGR flow 112. The controller 144 may determine 510 that sufficient EGR flow 112 is available if the EGR flow exceeds an EGR threshold.

For example, the controller 114 may receive a mass flow value of the EGR flow 112 from a mass flow sensor and determine 510 there is sufficient EGR flow 112 if the EGR flow mass flow exceeds a mass flow EGR threshold. Alternatively, the controller 114 may receive a pressure value of the EGR flow 112 from a pressure sensor and determine 510 that there is sufficient EGR flow 112 if the EGR flow pressure exceeds a pressure EGR threshold. In a certain embodiment, the controller 114 receives a temperature value of the EGR flow 112 from a temperature sensor and determines 510 that sufficient EGR flow 112 is available if the EGR flow temperature exceeds a temperature EGR threshold.

Alternatively, the controller 144 may calculate an exhaust gas estimate as a function of the combusted fuel 152. In a certain embodiment, the controller 144 calculates the exhaust gas estimate as a function of one or more of the combusted fuel 152, the pressure, the temperature, or in the mass flow. The controller 144 may employ a lookup table to perform the calculation.

In one embodiment, the controller 144 determines 510 that sufficient EGR flow 112 is available if a specified number of donor cylinders 110 have been provided with fuel 152 and fired 212. The specified number of donor cylinders 110 may be in the range of 1 to 4 donor cylinders 110.

If sufficient EGR flow 112 is not available, the controller 144 loops to determine 504 if a subsequent intake stroke 211 is for a donor cylinder 110. If sufficient EGR flow 112 is available, the fuel variable restriction 154 provides 512 fuel 152 to the subsequent donor and non-donor cylinders 110 and the method 500 ends.

By initially providing fuel 152 to donor cylinders 110 in response to a transition event 218, and subsequently providing fuel 152 to non-donor cylinders 110 when sufficient EGR flow 112 is available, the embodiments reduce the number of cylinders 110 that fire before sufficient EGR flow 112 is available for EGR. As a result, engine knocking may be reduced. In addition, the engine 102 may produce fewer pollutants such as nitrous oxides and operate more efficiently.

The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus for exhaust gas recirculation control comprising:
   a first donor cylinder and a second donor cylinder of a plurality of cylinders in an engine, the first donor cylinder and the second donor cylinder configured to provide exhaust gas recirculation (EGR) flow to an air intake for the plurality of cylinders; and
   a controller configured to control a fuel variable restriction in response to an engine operating condition, the fuel variable restriction initially providing a first amount of fuel concurrent with an intake stroke for the first donor cylinder before the first amount of fuel is provided to at least one non-donor cylinder in response to a transition from withholding the fuel to the plurality of cylinders, wherein the first amount of fuel is less than an amount of fuel required by the transition, wherein the fuel variable restriction subsequently provides a second amount of fuel to a second donor cylinder, and wherein the second amount of fuel is an amount of fuel required by the transition.

2. The apparatus of claim 1, the fuel variable restriction further withholding the fuel from at least one non-donor cylinder of the plurality of cylinders prior to the intake stroke for the first donor cylinder.

3. The apparatus of claim 2, wherein the fuel variable restriction withholds the fuel from the at least one non-donor cylinder until the EGR flow exceeds an EGR threshold.

4. The apparatus of claim 2, wherein at least two donor cylinders are provided with fuel prior to firing the at least one non-donor cylinder.

5. The apparatus of claim 2, the fuel variable restriction further withholding fuel from each cylinder that is not firing.

6. The apparatus of claim 1, wherein providing first amount of fuel to the first donor cylinder causes the first donor cylinder to produce less torque than otherwise would be produced by the first donor cylinder in response to the transition, prior to providing fuel to the at least one non-donor cylinder, thereby causing a non-firing of the at least one non-donor cylinder to be less discernable to an operator of the engine.

7. The apparatus of claim 6, wherein the torque produced by the first donor cylinder is further reduced by retarding the firing of a spark plug prior to providing fuel to the at least one non-donor cylinder.

8. A method for exhaust gas recirculation control comprising:
   providing exhaust gas recirculation (EGR) flow to an air intake for a plurality of cylinders from a first donor cylinder and a second donor cylinder of the plurality of cylinders in an engine;
   initially providing a first amount of fuel from a fuel variable restriction concurrent with an intake stroke for the first donor cylinder before the first amount of fuel is provided to at least one non-donor cylinder in response to a transition from withholding the fuel to the plurality of cylinders to providing the fuel to the plurality of cylinders, wherein the first amount of fuel is less than an amount of fuel required by the transition, wherein the fuel variable restriction subsequently provides a second amount of fuel to a second donor cylinder, and wherein the second amount of fuel is an amount of fuel required by the transition.

9. The method of claim 8, wherein the fuel variable restriction further withholds the fuel from at least one non-donor cylinder of the plurality of cylinders prior to the intake stroke for the first donor cylinder.

10. The method of claim 9, wherein the fuel variable restriction withholds the fuel from the at least one non-donor cylinder until the EGR flow exceeds an EGR threshold.

11. The method of claim 9, wherein at least two donor cylinders are provided with fuel prior to firing the at least one non-donor cylinder.

12. The method of claim 9, wherein the fuel variable restriction further withholds fuel from each cylinder that is not firing.

13. The method of claim 8, wherein providing first amount of fuel to the first donor cylinder causes the first donor cylinder to produce less torque than otherwise would be produced by the at least one donor cylinder in response to the transition, prior to providing fuel to the at least one non-donor cylinder, thereby causing a non-firing of the at least one non-donor cylinder to be less discernable to an operator of the engine.

14. The method of claim 13, wherein the torque produced by the first donor cylinder is further reduced by retarding the firing of a spark plug prior to providing fuel to the at least one non-donor cylinder.

15. A system for exhaust gas recirculation control comprising:
- an engine comprising a first donor cylinder, a second donor cylinder, and at least one non-donor cylinder of a plurality of cylinders, the first donor cylinder and the second donor cylinder configured to provide Exhaust Gas Recirculation (EGR) to an air intake for the plurality of cylinders; and
- a controller configured to control a fuel variable restriction in response to an engine operating condition, the fuel variable restriction initially providing a first amount of fuel concurrent with an intake stroke for the first donor cylinder before the first amount of fuel is provided to at least one non-donor cylinder in response to a transition from withholding the fuel to the plurality of cylinders to providing the fuel to the plurality of cylinders, wherein the first amount of fuel is less than an amount of fuel required by the transition, wherein the fuel variable restriction subsequently provides a second amount of fuel to a second donor cylinder, and wherein the second amount of fuel is an amount of fuel required by the transition.

16. The system of claim 15, wherein the fuel variable restriction further withholds the fuel from at least one non-donor cylinder of the plurality of cylinders prior to the intake stroke for the first donor cylinder.

17. The system of claim 16, wherein the fuel variable restriction withholds the fuel from the at least one non-donor cylinder until the EGR flow exceeds an EGR threshold.

18. The system of claim 16, wherein at least two donor cylinders are provided with fuel prior to firing the at least one non-donor cylinder.

19. The system of claim 16, wherein the fuel variable restriction further withholds fuel from each cylinder that is not firing.

20. The system of claim 15, wherein providing first amount of fuel to the first donor cylinder causes the first donor cylinder to produce less torque than otherwise would be produced by the at least one donor cylinder in response to the transition, prior to providing fuel to the at least one non-donor cylinder, thereby causing a non-firing of the at least one non-donor cylinder to be less discernable to an operator of the engine.

* * * * *